United States Patent Office
3,595,969
Patented July 27, 1971

3,595,969
ANAEROBIC ADHESIVE COMPOSITION
Thomas H. Shepherd, Hopewell, and Francis E. Gould, Princeton, N.J., assignors to Princeton Chemical Research, Inc., Princeton, N.J.
No Drawing. Continuation-in-part of abandoned application Ser. No. 541,429, Mar. 9, 1966. This application Aug. 13, 1969, Ser. No. 849,893
Int. Cl. C09j 3/14, 5/10; C07c 69/76
U.S. Cl. 260—28.5
6 Claims

ABSTRACT OF THE DISCLOSURE

An anaerobic adhesive consists of a half-ester of (1) a tetracarboxylic acid having an aromatic nucleus with the carboxylic acid groups being attached thereto and (2) a hydroxy lower alkyl methacrylate. This is a continuation-in-part of application S.N. 541,429 filed Mar. 9, 1966, now abandoned.

This invention relates to a novel adhesive composition. The invention more particularly relates to an adhesive composition the setting action of which is inhibited by oxygen and which thus may be termed an anaerobic adhesive composition.

The novel adhesive composition comprises a half-ester formed by the reaction of a tetracarboxylic acid or anhydride with a hydroxyalkyl methacrylate monomer.

The starting polycarboxylic acids or anhydrides have the general formula:

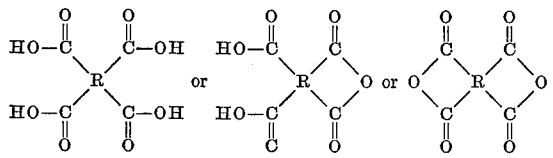

in which R represents an aryl, polyaryl nucleus or bis-aryl radicals containing a connecting hydrocarbon, oxygen, sulfur, thionyl, dithionyl, or carbonyl bridge or the like. Examples of the hydrocarbon radicals which R may represent include:

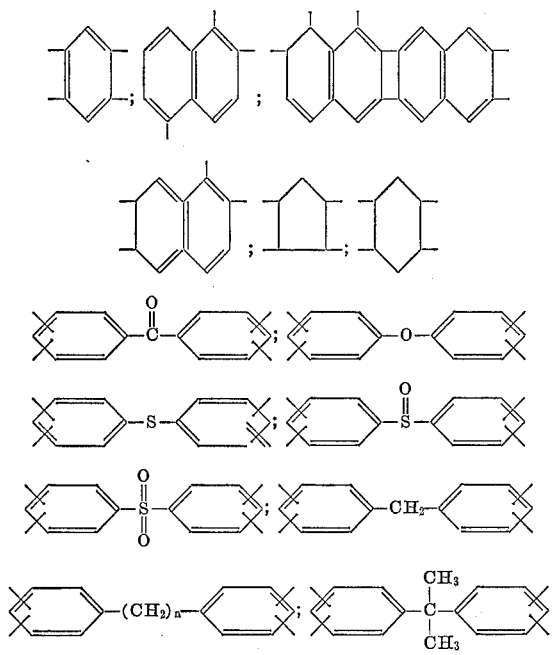

In the final esters which form the adhesive composition the radical represented by R only, so to speak, holds the functional groups in place. Any of the known aromatic radicals, including those containing hetero-atoms or other functional groups may be used, the only limitation being that the same should not contain hetero-atoms or functionally reactive groups which could interfere with the ester or amide formation and/or the subsequent polymerization thereof.

Examples of the hydroxy lower alkyl methacrylate monomers include:

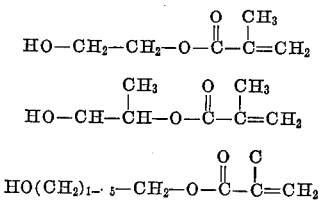

The esterification of the polycarboxylic acid or anhydride with the hydroxyvinyl monomer is effected in the conventional manner for this type of esterification reaction. Thus the acid or anhydride is admixed with the vinyl alcohol preferably in the presence of oxygen, as for example under air.

The reaction may be carried out by stirring the reactants together at temperatures of 0–170° C., and preferably between 50 and 120° C. and at pressures between 0.2 atmosphere and 20 atmospheres and preferably 0.5 to 10 atmospheres. The molar ratio of the alcohol to the acid or anhydride may vary between 1:1 to 5:1, although it is preferred to operate at molar ratios between 1:1 and 3:1. Unreacted alcohol is removed by distillation at reduced pressures to yield the ester in unadulterated form.

Most preferably the reaction is so effected that half of the available groups are converted, forming a semi-ester.

Thus, in connection with the tetracarboxylic acids and/or dianhydrides, 2 mols of the alcohol are reacted per mol of the carboxylic compound.

The remaining unconverted carboxylic or anhydride groups may remain as such, or may be converted either prior to, during or after the reaction into the form of a salt, as for example, with a metal ion such as a lithium, sodium, potassium, calcium, magnesium, barium, zinc, cobalt, iron, nickel, manganese, copper, strontium, cadmium, tin, aluminum, chromium metal ion, or may be converted to an ester or amide group as for example with methyl, ethyl, isopropyl, normal propyl, normal butyl, isobutyl, neopentol, ethylhexyl, lauryl, octyl, alcohols or amines.

In connection with a preferred embodiment of the invention a portion of the vinyl alcohol is replaced with a non-polymerizable alcohol. For example 1.5 mols of a vinyl alcohol and 0.5 mol of a saturated alcohol are reacted per mol of the carboxylic compounds to afford a more flexible and tough cured adhesive compound.

These groups instead of being converted into the form of a metal salt with a metal ion which may, for example, be mono-, di-, or trivalent, may also be converted into a salt with ammonia, primary or secondary aliphatic amines, or the like.

The neutralization of the residual carboxyl groups as described above may be desirable in certain instances, as for example, the formation of stable emulsion adhesives.

The esters obtained are generally a viscous liquid and act as an anaerobic setting adhesive. The addition of a vinyl polymerization catalyst, as for example, a peroxide catalyst, such as a hydroperoxide as for instance cumene hydroperoxide, benzyl hydroperoxide, t-butyl hydroperoxide, methyl ethyl ketone peroxide, and the like will aid the setting of the adhesive. The amount of peroxide catalyst may vary from 0 to 5%, and preferably from 0 to 2.5% of the adhesive composition.

The adhesive composition even after the addition of a catalyst has almost unlimited shelf life in the presence of oxygen, as for example, with a surface in contact with air but will cure to a tenacious adhesive and generally a flexible adhesive when exposure to oxygen, as for example exposure to air is prevented.

The setting or curing of the adhesive is generally also catalyzed by the presence of metal ions, such as iron, zinc, cadmium, or cobalt nickel copper.

To set the adhesive it is thus only generally necessary to confine the same between the surfaces to be bonded, preferably in the presence of metal ions. Where one or both of the surfaces being bonded constitutes a metal surface, this is sufficient to catalyze the setting. If, however, the surfaces are not metal, or do not contain metal, it may be desirable to add a metal to the adhesive composition. The metal that is added may be in the form of a finely ground powder of iron, zinc, copper, cadmium, cobalt, nickel, or possibly in the form of a salt.

The metals supplying the metal ions may be initially added to the adhesive composition and will not cause a premature setting as long as the same remains exposed to oxygen, such as in the air.

The adhesive will set at normal temperature and over a wide range of temperatures, as for example, from 0 to 200° C., and preferably from 15 to 125° C.

The degree of exposure to oxygen, such as air in order to prevent curing even at elevated temperatures is not too extensive and the adhesive in a bottle or other container having a free surface exposed to the air in the container will not cure even when stored for long periods at elevated temperatures, as for example, at a temperature of 100° F.

The viscosity of the adhesive composition in accordance with the invention may be controlled and adjusted with the use of suitable additives. Thus, for example, the viscosity may be reduced by the addition of polar solvents, such as ketones, alcohols, or esters, or by mixtures thereof. In general amounts of 5 to 50% of such solvents may be added so the viscosity may be reduced to that of a thin liquid.

The viscosity of the adhesive compositions on the other hand may be increased by the addition of extenders or filling agents, as for example pigments, silica, metal silicates, metal carbonates, metal sulfates, carbon blacks, etc.

Suitable dyes may also be added for appearance purposes or for color coding. In general amounts of fillers and/or dyes of about 0.1% to 50%, and preferably 1% to 30% may be used.

The characteristics of the adhesive composition may be modified and varied by the addition of minor amounts of other vinyl monomers or cross-linking agents, as for example, styrene, diallyl adipate, divinyl benzene, dialkylcarbonate, allylacetone, or methacrylonitrile. These additives in addition to allowing adjustment of the viscosity may be used to control the strength and elasticity of the material.

While the adhesive composition in accordance with the invention may be used for bonding and/or sealing, the most varied material and in general wherever a flexible adhesive is required between surfaces, the same is particularly well suited for bonding nuts, bolts and similar fasteners. For this purpose the adhesive is generally applied to the thread of the nut and/or bolt. When the nut and bolt with the adhesive thus applied are screwed together, air is excluded between the contacting threads and the adhesive sets firmly locking the nut and bolt together. The elasticity of the set adhesive composition generally prevents the elements from working loose even under severe vibration conditions.

By proper selection of the amount and type of a catalyst and/or by the use of other reactive monomers, the bond or torque strength can be so controlled so as to obtain what may be considered a permanent bond or to obtain a bond which will hold tight under normal use and yet which will allow a loosening or freeing of the elements when desired. For example, an adhesive composition containing no added monomer when cured in the threads of a ⅝″ nut and bolt showed a break-away torque of 45 ft./lbs. When the same adhesive composition containing 10% styrene was similarly tested, a break-away torque of 75 ft./lbs. was observed.

The adhesive composition in accordance with the invention has the particular advantage in that the same may be applied to the elements well in advance of their joining and will not prematurely set and cure and will only set and cure when the same are joined. The adhesive composition has a further advantage in that the same will only cure in the immediate area of contact of the threads. Thus, for example, if a bolt to which the adhesive composition has been applied is retightened even after a prolonged period, the threads will come in contact with a new, uncured area, which, in turn, will cure. This is of substantial advantage as compared with prior known compositions where any turning of the nut in relation to the bolt would break the adhesive bond. Furthermore, the elasticity of the composition in the thread acts as a lock against relative turning even in the absence of an actual bond between the surfaces.

A preferred adhesive composition in accordance with the invention is one formed by the reaction of pyromellitic acid or anhydride, such as pyromellitic dianhydride with a hydroxy lower alkylmethacrylate or acrylate, such as hydroxypropylmethacrylate in a molar ratio of about 2:1, as for example at a temperature between about 70–80° C. in an inert atmosphere under azeotropic conditions, as for example, in the presence of refluxing benzene to remove water formed by the reaction, with the resulting viscous half ester formed catalyzed with a hydroperoxide, such as cumene hydroperoxide in an amount of about 0.5 to 5, and preferably about 2.5%. The composition may additionally contain up to about 25%, as for example 10–20% of a reactive allyl or vinyl monomer, as for example styrene diallyl adipate, divinyl benzene, diallyl carbonate, allyl acetone, or methacrylonitrile, and may still further contain up to 30% by weight of an inert filler and/or colored pigment.

Examples of other preferred compositions include the reaction produced of pyromellitic dianhydride with 1.0 to 1.5 mols of hydroxy propylmethacrylate acid 0.5–1 mols of n-butyl alcohol, to which is added 0.5 to 10 weight percent of zinc dust.

The following examples are given by way of illustration and not limitation:

Example 1

Into a three neck round bottom flask which is equipped with a stirrer, $N_2$ inlet tube, thermometer and a water cooled condenser is placed one mol hydroxypropylmethacrylate (as a 40% solution in xylene) and one-half mol pyromellitic anhydride (containing 2.5% PMA). The slurry is vigorously stirred and heated for 3½ hours at 70–85° C. at which time the slurry has gradually dissolved yielding a pale yellow, slightly hazy solution. While the warm solution is rapidly stirred, $N_2$ is bubbled through the solution to strip off the xylene. The resulting viscous adhesive is catalyzed with 1.0% cumene hydroperoxide, and applied to cadmium plated ¼″ bolts. It was observed that after aging overnight at room temperature anaerobic cure had occurred in the threads covered by the nut sufficiently to cement the nut while adjacent exposed areas remained tacky.

Example 2

Using a three-neck round bottom flask as in Example 1, one mol hydroxypropyl methacrylate (96% solution in xylene) was heated and vigorously stirred under an atmosphere of $N_2$ at 75–82° C. for about 5½ hours. The slightly hazy, viscous adhesive was cooled to 40° C. and 10% by weight of styrene was stirred in. When this adhesive is catalyzed with 2.5% by weight of cumene hydroperoxide and applied to ⅝" x 2" cadmium plate bolts, break-away torque values of 75 ft./lbs. were measured with a torque wrench after the bolt and cemented nut cured for 10 days at room tempertaure.

Example 3

When the adhesive of Example 2 is further modified with an additional 10% by weight of diallyl adipate, catalyzed with 5.0% by weight of cumene hydroperoxide break-away torque values of 30 ft./lbs. were obtained on ⅝" steel bolts and 20 ft./lbs. on ⅝" galvanized bolts after curing at room temperature for 10 days.

Example 4

To a 200 ml. flask equipped with a stirrer and heating mantle, 0.5 mol of pyromellitic dianhydride and 0.5 mol of n-butanol were added. The mixture was heated to 80° C. and was stirred for 2 hours, whereupon 0.5 mol of hydroxypropylmethacrylate was added. Heating was continued an additional 3 hours whereupon a viscous light yellow reaction product consisting primarily of a mixed n-butyl, propylmethacrylate pyromellitic ester was obtained. To this viscous mixture 10 weight percent Zn dust was added and the composition was placed on a ⅝" aluminum bolt and an aluminum nut was run onto the bolt. After standing 5 days at room temperature, a torque of 30 ft./lbs. was required to start rotation of the nut, and a prevailing torque of 9 ft./lbs. was required to move the nut over 3 revolutions in each direction from the original position.

Example 5

Example 1 is repeated using however, 2 mols of the hydroxypropylmethacrylate. The resulting viscous adhesive catalyzed with cumene hydroperoxide may be used to bond a nut as described in Example 1.

Example 6

Example 1 may be repeated using in place of the pyromellitic anhydride and the hydroxypropylmethacrylate each of the polycarboxylic acids or anhydrides listed in Table I, with each of the methacrylate monomers having the above given structures. In each case the anaerobic adhesive will be formed.

TABLE I

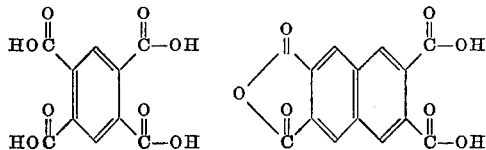

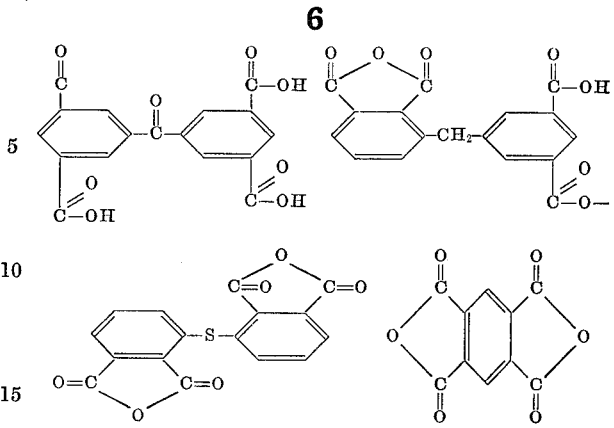

We claim:

1. An anaerobic adhesive containing as the adhesive component a half-ester of (1) a tetracarboxylic acid having an aromatic nucleus with the carboxylic acid groups being attached thereto, and (2) a hydroxy lower alkyl methacrylate, said adhesive remaining substantially uncured so long as said adhesive remains exposed to oxygen and setting to a substantially cured adhesive composition when excluded from contact with oxygen.

2. The adhesive of claim 1 containing a hydroperoxide catalyst and an ion selected from the group consisting of iron, zinc, cadmium, copper, cobalt and nickel ions.

3. An anaerobic adhesive containing a half-ester of pyromellitic acid and hydropropylmethacrylate, said adhesive remaining substantially uncured so long as said adhesive remains exposed to oxygen and setting to a substantially cured adhesive composition when excluded from contact with oxygen.

4. The adhesive of claim 3 containing cumene hydroperoxide as a catalyst.

5. The adhesive of claim 3 containing in addition in the range of 10 to 20 percent of a monomer selected from the group consisting of diallyl adipate and styrene.

6. The method of adhering two materials to one another which comprises placing therebetween an adhesive in accordance with claim 2 and holding said materials in contact with one another with the adhesive therebetween in the absence of air until the adhesive has cured and set.

References Cited

UNITED STATES PATENTS

| | | |
|---|---|---|
| 3,150,118 | 9/1964 | Clemens. |
| 3,336,360 | 8/1967 | Dill. |
| 3,451,980 | 6/1969 | Brownstein _____ 260—78.5 |

JAMES E. SEIDLECK, Primary Examiner

J. KIGHT III, Assistant Examiner

U.S. Cl. X.R.

260—475; 156—332; 151—14.5, 41.7